US012687749B2

(12) United States Patent (10) Patent No.: US 12,687,749 B2

Han et al. (45) Date of Patent: Jul. 21, 2026

(54) LIQUID CRYSTAL DISPLAY DEVICE

(71) Applicant: TCL CHINA STAR OPTOELECTRONICS TECHNOLOGY CO., LTD., Shenzhen (CN)

(72) Inventors: Yutong Han, Shenzhen (CN); Juncheng Xiao, Shenzhen (CN); Ji Li, Shenzhen (CN); Xiaojin He, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 488 days.

(21) Appl. No.: 17/597,920

(22) PCT Filed: Jan. 14, 2022

(86) PCT No.: PCT/CN2022/071977

§ 371 (c)(1),
(2) Date: Sep. 21, 2024

(87) PCT Pub. No.: WO2023/123570

PCT Pub. Date: Jul. 6, 2023

(65) Prior Publication Data

US 2025/0035983 A1      Jan. 30, 2025

(30) Foreign Application Priority Data

Dec. 30, 2021      (CN) .......................... 202111636451.0

(51) Int. Cl.
*G02F 1/1335*      (2006.01)

(52) U.S. Cl.
CPC .. *G02F 1/133614* (2021.01); *G02F 1/133512* (2013.01); *G02F 1/133528* (2013.01); *G02F 2202/28* (2013.01)

(58) Field of Classification Search
CPC ......... G02F 1/133614; G02F 1/133512; G02F 1/133528; G02F 2202/28
See application file for complete search history.

(56) References Cited

U.S. PATENT DOCUMENTS

2004/0209007 A1 * 10/2004 Satake ..................... G02B 1/16
                                                            428/1.3
2018/0006093 A1 *  1/2018 Kim ....................... H10K 59/38
(Continued)

FOREIGN PATENT DOCUMENTS

CN          104280935 A        1/2015
CN          105204106 A        12/2015
(Continued)

OTHER PUBLICATIONS

Chinese Office Action in corresponding Chinese Patent Application No. 202111636451.0 dated Feb. 9, 2022, pp. 1-8.
(Continued)

*Primary Examiner* — David Y Chung
(74) *Attorney, Agent, or Firm* — PV IP PC; Christopher S. Ruprecht; Wei Te Chung

(57) ABSTRACT

The present application provides a liquid crystal display device. The liquid crystal display device includes a first substrate, a second substrate, a liquid crystal layer, an upper polarizer, a color conversion layer and a third substrate. The second substrate is arranged opposite to the first substrate. The liquid crystal layer is arranged between the first substrate and the second substrate. The upper polarizer is arranged on a side of the second substrate away from the first substrate. The color conversion layer is arranged on a side of the upper polarizer away from the second substrate. The (Continued)

third substrate is arranged on a side of the color conversion layer away from the upper polarizer.

20 Claims, 7 Drawing Sheets

(56)                    References Cited

U.S. PATENT DOCUMENTS

| | | | | |
|---|---|---|---|---|
| 2018/0143497 A1 * | 5/2018 | Kim | .................. | G02F 1/133528 |
| 2018/0284613 A1 * | 10/2018 | Hirayama | ............. | G03F 7/0007 |
| 2019/0025484 A1 * | 1/2019 | Kim | ..................... | G02B 5/3033 |
| 2019/0171067 A1 | 6/2019 | Lee et al. | | |
| 2025/0085591 A1 * | 3/2025 | Han | .................. | G02F 1/133614 |

FOREIGN PATENT DOCUMENTS

| | | | |
|---|---|---|---|
| CN | 105223724 A | 1/2016 |
| CN | 105353554 A | 2/2016 |
| CN | 106597748 A | 4/2017 |
| CN | 106680925 A | 5/2017 |
| JP | 2014026219 A | 2/2014 |

OTHER PUBLICATIONS

International Search Report in International application No. PCT/CN2022/071977,mailed on Sep. 29, 2022.
Written Opinion of the International Search Authority in International application No. PCT/CN2022/071977,mailed on Sep. 29, 2022.

* cited by examiner

1

LIQUID CRYSTAL DISPLAY DEVICE

CROSS REFERENCE TO RELATED APPLICATIONS

This application is a national stage of International Application No. PCT/CN2022/071977 filed on Jan. 14, 2022, which claims priority to and the benefit of Chinese Patent Application No. 202111636451.0 filed on Dec. 30, 2021, the applications of which are incorporated herein by reference in their entirety.

TECHNICAL FIELD

The present application relates to a display technology field, and more particularly to a liquid crystal display device.

BACKGROUND

When a color conversion layer containing a color conversion material, such as down-conversion fluorescent material, is provided in the color filter substrate of a liquid crystal display (Liquid Crystal Display, LCD), under the excitation of polarized light, the polarization state of the emitted light generated by the down-conversion fluorescent material after being excited will change due to the influence of the polarization characteristics of the fluorescence.

TECHNICAL PROBLEM

The polarization state of the emitted light generated by the down-conversion fluorescent material after being excited will change, causing the LCD to leak light in the dark state, which greatly reduces the contrast of the LCD.

TECHNICAL SOLUTIONS

The embodiment of the present application provides a liquid crystal display device, to solve the technical problem of the LCD contrast reduction in the prior art.

The embodiment of the present application provides a liquid crystal display device, wherein the liquid crystal display device includes:

a first substrate;

a second substrate arranged opposite to the first substrate;

a liquid crystal layer arranged between the first substrate and the second substrate;

an upper polarizer arranged on a side of the second substrate away from the first substrate;

a color conversion layer arranged on a side of the upper polarizer away from the second substrate; and a third substrate arranged on a side of the color conversion layer away from the upper polarizer.

Optionally, in some embodiments of the present application, the liquid crystal display device includes a plurality of pixel areas, and each of the pixel areas includes a first sub-pixel area, a second sub-pixel area and a third sub-pixel area, and the color conversion layer includes a first color conversion part, a second color conversion part and a light-transmitting part that are arranged at intervals, and the first color conversion part and the second color conversion part are employed for converting light of different colors, the first color conversion part is located in the first sub-pixel area, and the second color conversion part is located in the second sub-pixel area, and the light-transmitting part is located in the third sub-pixel area.

Optionally, in some embodiments of the present application, the first sub-pixel area is a red sub-pixel area, the second sub-pixel area is a green sub-pixel area, the third sub-pixel area is a blue sub-pixel area, and light emitted by a backlight module of the liquid crystal display device is blue light, and a material of the first color conversion part includes a red fluorescent material and a red filter material, a material of the second color conversion part includes a green fluorescent material and a green filter material and the light-transmitting part includes a blue filter material.

Optionally, in some embodiments of the present application, the red fluorescent material is red fluorescent powder or red quantum dots, and the green fluorescent material is green fluorescent powder or green quantum dots.

Optionally, in some embodiments of the present application, the first sub-pixel area is a red sub-pixel area, the second sub-pixel area is a green sub-pixel area, the third sub-pixel area is a blue sub-pixel area, and light emitted by a backlight module of the liquid crystal display device is blue light, and a material of the first color conversion part includes a red fluorescent material and a material of the second color conversion part includes a green fluorescent material, and the liquid crystal display device further includes a blue light absorbing layer located on a side of the first color conversion part and the second color conversion part away from the upper polarizer.

Optionally, in some embodiments of the present application, the blue light absorbing layer includes a red filter part and a green filter part, and the red filter part is located on a side of the first color conversion part away from the upper polarizer, and the green filter part is located on a side of the second color conversion part away from the upper polarizer.

Optionally, in some embodiments of the present application, the material of the light-transmitting part includes a blue filter material, and the liquid crystal display device further includes a blue filter part, and the blue filter part and the blue light absorbing layer are arranged in a same layer, and are located on a side of the light-transmitting part away from the upper polarizer.

Optionally, in some embodiments of the present application, the liquid crystal display device further includes a protective layer located on the side of the color conversion layer close to the upper polarizer.

Optionally, in some embodiments of the present application, a material of the protective layer includes one or more of silicon nitride, silicon oxide and silicon oxynitride.

Optionally, in some embodiments of the present application, the liquid crystal display device further includes an adhesive layer, and the adhesive layer is attached between the upper polarizer and the protective layer or the adhesive layer is attached to an outer periphery of connection between the upper polarizer and the protective layer.

Optionally, in some embodiments of the present application, the liquid crystal display device further includes a light-shielding part provided on a side of the third substrate close to the upper polarizer, and the light-shielding part is located between the first color conversion part and the second color conversion part, between the first color conversion part and the light-transmitting part and between the second color conversion part and the light-transmitting part.

The embodiment of the present application further provides a liquid crystal display device, wherein the liquid crystal display device includes:

a first substrate;

a second substrate arranged opposite to the first substrate;

a liquid crystal layer arranged between the first substrate and the second substrate;

an upper polarizer arranged on a side of the second substrate away from the first substrate;

a color conversion layer arranged on a side of the upper polarizer away from the second substrate;

a third substrate arranged on a side of the color conversion layer away from the upper polarizer; and a light-shielding part arranged on a side of the third substrate close to the upper polarizer;

wherein the liquid crystal display device includes a plurality of pixel areas, and each of the pixel areas includes a first sub-pixel area, a second sub-pixel area and a third sub-pixel area, and the color conversion layer includes a first color conversion part, a second color conversion part and a light-transmitting part that are arranged at intervals, and the first color conversion part and the second color conversion part are employed for converting light of different colors, the first color conversion part is located in the first sub-pixel area, and the second color conversion part is located in the second sub-pixel area, and the light-transmitting part is located in the third sub-pixel area; the light-shielding part is located between the first color conversion part and the second color conversion part, between the first color conversion part and the light-transmitting part and between the second color conversion part and the light-transmitting part.

Optionally, in some embodiments of the present application, the first sub-pixel area is a red sub-pixel area, the second sub-pixel area is a green sub-pixel area, the third sub-pixel area is a blue sub-pixel area, and light emitted by a backlight module of the liquid crystal display device is blue light, and a material of the first color conversion part includes a red fluorescent material and a red filter material, a material of the second color conversion part includes a green fluorescent material and a green filter material and the light-transmitting part includes a blue filter material.

Optionally, in some embodiments of the present application, the red fluorescent material is red fluorescent powder or red quantum dots, and the green fluorescent material is green fluorescent powder or green quantum dots.

Optionally, in some embodiments of the present application, the first sub-pixel area is a red sub-pixel area, the second sub-pixel area is a green sub-pixel area, the third sub-pixel area is a blue sub-pixel area, and light emitted by a backlight module of the liquid crystal display device is blue light, and a material of the first color conversion part includes a red fluorescent material and a material of the second color conversion part includes a green fluorescent material, and the liquid crystal display device further includes a blue light absorbing layer located on a side of the first color conversion part and the second color conversion part away from the upper polarizer.

Optionally, in some embodiments of the present application, the blue light absorbing layer includes a red filter part and a green filter part, and the red filter part is located on a side of the first color conversion part away from the upper polarizer, and the green filter part is located on a side of the second color conversion part away from the upper polarizer.

Optionally, in some embodiments of the present application, the material of the light-transmitting part includes a blue filter material, and the liquid crystal display device further includes a blue filter part, and the blue filter part and the blue light absorbing layer are arranged in a same layer, and are located on a side of the light-transmitting part away from the upper polarizer.

Optionally, in some embodiments of the present application, the liquid crystal display device further includes a protective layer located on the side of the color conversion layer close to the upper polarizer.

Optionally, in some embodiments of the present application, a material of the protective layer includes one or more of silicon nitride, silicon oxide and silicon oxynitride.

Optionally, in some embodiments of the present application, the liquid crystal display device further includes an adhesive layer, and the adhesive layer is attached between the upper polarizer and the protective layer or the adhesive layer is attached to an outer periphery of connection between the upper polarizer and the protective layer.

BENEFICIAL EFFECTS

Compared with the liquid crystal display device in the prior art, the liquid crystal display device of the present application provides the color conversion layer on the side of the upper polarizer away from the liquid crystal layer. When the liquid crystal display device is in the dark state, the backlight is first formed into polarized light through the lower polarizer. Then, the polarized light passes through the liquid crystal layer. Then, the polarized light passing through the liquid crystal layer enters the color conversion layer after undergoing the analyzer function of the upper polarizer. Since the polarized light will not be affected by the color conversion layer before entering the upper polarizer, the polarization state thereof will not change. Therefore, after undergoing the analyzer function of the upper polarizer, the liquid crystal display device will not leak light in the dark state, so that the contrast of the liquid crystal display device can be greatly improved.

BRIEF DESCRIPTION OF THE DRAWINGS

In order to more clearly illustrate the embodiments of the present application, the following figures will be described in the embodiments are briefly introduced. It is obvious that the drawings are only some embodiments of the present application, those of ordinary skill in this field can obtain other figures according to these figures without paying the premise.

DETAILED DESCRIPTION

Figure 1:
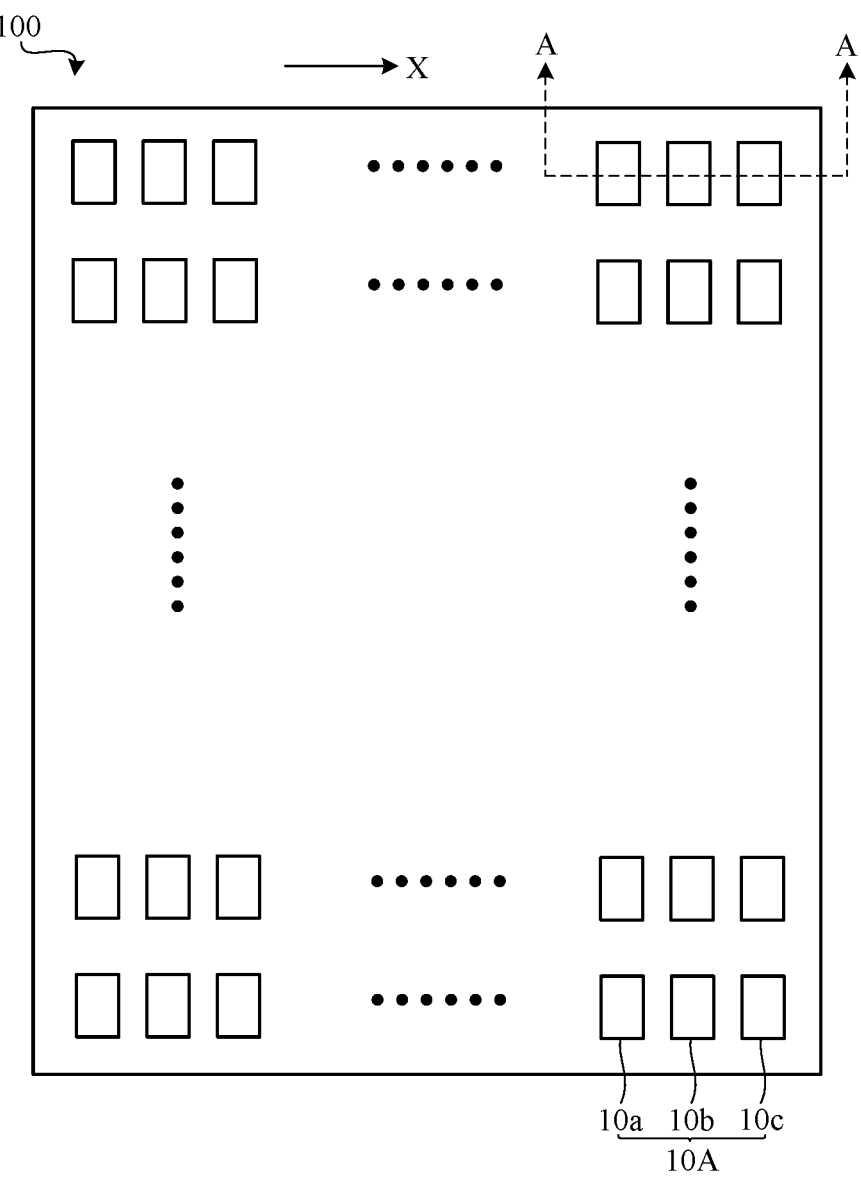
FIG. 1 is a diagram of a planar structure of a liquid crystal display device provided by the present application.

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of skilled in the premise of no creative efforts obtained, should be considered within the scope of protection of the present application. Besides, it should be understood that the specific embodiments described herein are merely for illustrating and explaining the present application and are not intended to limit the present application. In this application, if no explanation is made to the contrary, the orientation words used such as "upper" and "lower" usually refer to the upper and lower of the device in actual use or working state, which specifically are the directions of the drawing in the figures; and "inner" and "outer" refer to the outline of the device.

The embodiment of the present application provides a liquid crystal display device. The detail descriptions are respectively introduced below. It should be noted that the order of description in the following embodiments is not meant to limit the preferred order of the embodiments.

The present application provides a liquid crystal display device. The liquid crystal display device may be a display product, such as a mobile phone, a tablet, a notebook computer and a television. The liquid crystal display device includes a first substrate, a second substrate, a liquid crystal layer, an upper polarizer, a color conversion layer and a third substrate; the second substrate is arranged opposite to the first substrate; the liquid crystal layer is arranged between the first substrate and the second substrate; the upper polarizer is arranged on a side of the second substrate away from the first substrate; the color conversion layer is arranged on a side of the upper polarizer away from the second substrate; the third substrate is arranged on a side of the color conversion layer away from the upper polarizer.

Therefore, the liquid crystal display device provided by the present application arranges the color conversion layer on the side of the upper polarizer away from the liquid crystal layer. When the liquid crystal display device is in the dark state, the backlight is first formed into polarized light through the lower polarizer. Then, the polarized light passes through the liquid crystal layer. Then, the polarized light passing through the liquid crystal layer enters the color conversion layer after undergoing the analyzer function of the upper polarizer. Since the polarized light will not be affected by the color conversion layer before entering the upper polarizer, the polarization state thereof will not change. Therefore, after undergoing the analyzer function of the upper polarizer, the liquid crystal display device will not leak light in the dark state, so that the contrast of the liquid crystal display device can be greatly improved.

The liquid crystal display device provided in the present application will be described in detail below through specific embodiments.

Figure 2:
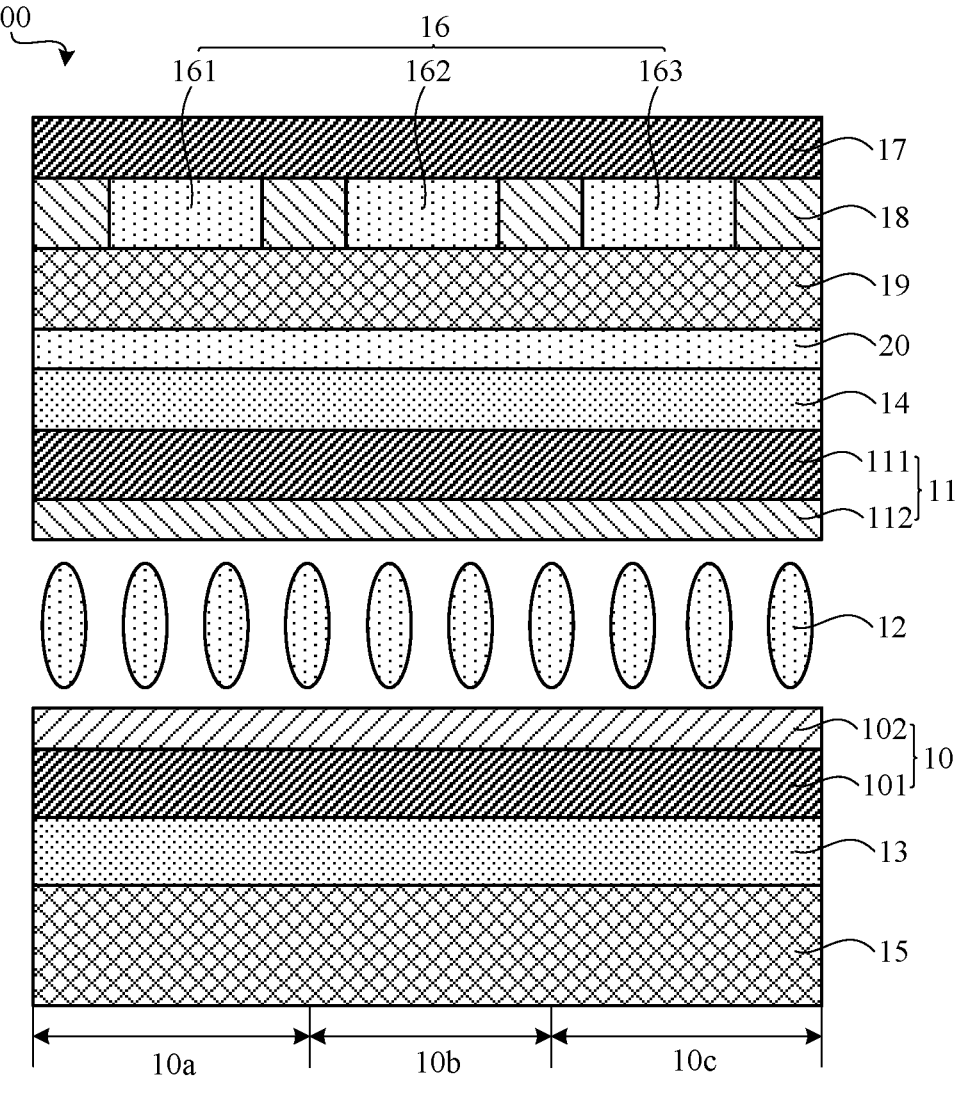
FIG. 2 is a cross-sectional view diagram of a first embodiment of the liquid crystal display device shown in FIG. 1 along a section line A-A'.

Please refer to FIG. 1 and FIG. 2. The first embodiment of the present application provides a liquid crystal display device 100. The liquid crystal display device 100 includes a first substrate 10, a second substrate 11, a liquid crystal layer 12, a lower polarizer 13, an upper polarizer 14, a backlight module 15 and a color conversion layer 16. The first substrate 10 and the second substrate 11 are opposed to each other. The liquid crystal layer 12 is arranged between the first substrate 10 and the second substrate 11. The upper polarizer 14 is arranged on the side of the second substrate 11 away from the first substrate 10. The lower polarizer 13 is arranged on the side of the first substrate 10 away from the second substrate 11. The backlight module 15 is arranged on the side of the lower polarizer 13 away from the first substrate 10. The color conversion layer 16 is arranged on the side of the upper polarizer 14 away from the second substrate 11.

In this embodiment, the liquid crystal display device 100 adopts the (Vertical Alignment, VA) display mode. In detail, the first substrate 10 includes a first base substrate 101 and a pixel electrode 102 arranged on the first base substrate 101. The pixel electrode 102 is located on the side of the first base substrate 101 close to the liquid crystal layer 12. The second substrate 11 includes a second base substrate 111 and a common electrode 112 provided on the second base substrate 111. The common electrode 112 is located on the side of the second base substrate 111 close to the liquid crystal layer 12. The common electrode 112 and the pixel electrode 102 are arranged opposite to each other.

Both the first base substrate 101 and the second base substrate 111 may be hard substrates, such as glass substrates. In detail, in this embodiment, a film structure such as a thin film transistor function layer (not shown in the figure) is further provided between the first base substrate 101 and the pixel electrode 102. Both the side of the pixel electrode 102 close to the liquid crystal layer 12 and the side of the common electrode 112 close to the liquid crystal layer 12 can be provided with an alignment film (not shown in the figure) for realizing the alignment of liquid crystals. The related technologies are all existing technologies, and will not be repeated here.

As shown in FIG. 1, the liquid crystal display device 100 includes a plurality of pixel areas 10A. Each of the pixel areas 10A includes a first sub-pixel area 10a, a second sub-pixel area 10b and a third sub-pixel area 10c. In this embodiment, the first sub-pixel area 10a is a red sub-pixel area, the second sub-pixel area 10b is a green sub-pixel area, and the third sub-pixel area 10c is a blue sub-pixel area.

In this embodiment, the light emitted by a backlight module 15 is blue light. In detail, the blue light source in the backlight module 15 may includes blue light emitting diodes. The blue light emitting diodes may be mini light emitting diodes or micro light emitting diodes. In detail, the specific structure of the backlight module 15 can refer to the prior art, which will not be repeated here.

Compared with the backlight design in the prior art that employs blue light emitting diodes and yellow phosphors in the backlight module 15 to form white light, in this application, the yellow fluorescent powder in the backlight module 15 is removed, and the blue light emitted by the blue light source is directly employed to enter the film structure, such as the lower polarizer 13 in the liquid crystal display device 100. It can avoid the loss of light energy due to the low excitation efficiency of the yellow fluorescent powder, thereby increasing the utilization rate of blue light and improving the energy efficiency of the backlight module 15.

The color conversion layer 16 includes a first color conversion part 161, a second color conversion part 162 and a light-transmitting part 163 that are arranged at intervals. The first color conversion part 161 and the second color conversion part 162 are employed for converting light of different colors. The first color conversion part 161 is located in the first sub-pixel area 10a. The second color conversion part 162 is located in the second sub-pixel area 10b. The light-transmitting part 163 is located in the third sub-pixel area 10c.

In this embodiment, the materials of the first color conversion part 161 and the second color conversion part 162 both include color conversion materials and filter materials.

In this embodiment, the color conversion material is a down-conversion material. Thus, the color conversion layer 16 can convert light with a shorter wavelength and higher energy into light with a longer wavelength and lower energy, thereby realizing color conversion. In detail, the down-conversion material in the first color conversion part 161 is a red down-conversion material, and the down-conversion material in the second color conversion part 162 is a green down-conversion material. Since the light emitted by the backlight module 15 is blue light, the first color conversion part 161 can generate red light under the excitation of blue light, and the second color conversion part 162 can generate green light under the excitation of blue light.

In this embodiment, the down-conversion materials of the first color conversion part 161 and the second color conversion part 162 are both fluorescent materials. In detail, the fluorescent material in the first color conversion part 161 is a red fluorescent material, and the red fluorescent material generates red light under the excitation of blue light. The red fluorescent material can be red fluorescent powder or red quantum dots. The fluorescent material in the second color conversion part 162 is a green fluorescent material, and the green fluorescent material generates green light under the excitation of blue light. The green fluorescent material can be green fluorescent powder or green quantum dots.

The red fluorescent powder may be Y2O3 doped with Ru. The red quantum dots can be red quantum dots with a core shell structure. The red quantum dot of the core shell structure includes a first quantum dot core and a first shell layer covering the first quantum dot core. In detail, the material of the first quantum dot core may be one or more of CdSe, Cd2SeTe and InAs, and the material of the first shell layer may be one or more of CdS, ZnSe, ZnCdS2, ZnS and ZnO. The green fluorescent powder may be SrGa2S4 doped with Ru. The green quantum dots can be green quantum dots with a core shell structure. The green quantum dot of the core shell structure includes a second quantum dot core and a second shell layer covering the second quantum dot core. In detail, the material of the second quantum dot core may be one or more of ZnCdSe2, InP and Cd2SSe, and the material of the second shell layer may be one or more of CdS, ZnSe, ZnCdS2, ZnS and ZnO. It should be noted that the aforesaid materials of red fluorescent powder, red quantum dots, green fluorescent powder and green quantum dots are only illustrations, and specific materials can be selected according to actual application requirements, which is not limited in this application.

The filter material reflects and absorbs light of a specific wavelength and transmits light of a specific wavelength to achieve color filtering and screening. In this embodiment, the filter material in the first color conversion part 161 is a red filter material, which is employed to filter light of colors other than red light. The filter material in the second color conversion part 162 is a green filter material, which is employed to filter light of colors other than green light. It should be noted that both the red filter material and the green filter material include resin, inorganic pigment particles and organic dyes. For related materials, reference can be made to the prior art, which will not be repeated here.

Furthermore, in this embodiment, the light-transmitting part 163 includes a blue filter material for filtering light of other colors other than blue light. The blue filter material includes resin, inorganic pigment particles and organic dyes. For related materials, reference can be made to the prior art, which will not be repeated here. Besides, in some embodiments, the light-transmitting part 163 may also be a transparent color resist layer. In this case, the light-transmitting part 163 does not possess a light filtering function, and will not be repeated here.

The blue light source is illustrated. The light path of the backlight in a traditional LCD is: blue light→lower polarizer→liquid crystal layer→color filter layer→upper polarizer. The inventor of the present application has discovered in experimental exploration that in case that fluorescent material is doped into the color filter layer of the traditional color filter substrate, when the liquid crystal display device is in the dark state, after the blue light is formed into polarized light through the lower polarizer, and when the polarized light enters the color filter substrate through the liquid crystal layer, due to the polarization characteristics of the fluorescent material, under the excitation of the polarized light, the polarization state of the polarized light passing through the color filter substrate will change, and after undergoing the analyzer function of the upper polarizer, a dark state light leakage phenomenon will occur.

Therefore, in this embodiment, the color conversion layer 16 doped with both fluorescent material and filter material is arranged on the side of the upper polarizer 14 away from the liquid crystal layer 12. When the liquid crystal display device 100 is in the dark state, the light path of the backlight is: blue light→lower polarizer 13→liquid crystal layer 12→upper polarizer 14→color conversion layer 16. Since the polarized light passing through the liquid crystal layer 12 enters the color conversion layer 16 after undergoing the analyzer function of the upper polarizer 14, that is, before entering the upper polarizer 14, the polarization state of the polarized light will not change, so the dark state light leakage will not occur, thereby greatly improving the contrast of the liquid crystal display device 100 to enhance the market competitiveness of display products.

In this embodiment, the liquid crystal display device 100 further includes a third substrate 17. The third substrate 17 is located on the side of the color conversion layer 16 away from the upper polarizer 14. The third substrate 17 may be hard substrates, such as a glass substrate. The above arrangement makes it possible to directly employ the third substrate 17 as a base substrate to form the color conversion layer 16 during the preparation process of the color conversion layer 16. Since the patterning of the color conversion layer 16 can be realized by using the existing equipment, it will not increase the difficulty of the process operation.

It can be understood that, for the liquid crystal display device 100 of the VA display mode, the function of the liquid crystal layer 12 is to adjust the electric field intensity through the change of the voltages in the upper and lower substrate electrodes, thereby controlling the twist of the liquid crystal, so as to control the intensity of the light passing through the liquid crystal. The light from the backlight module 15 enters the liquid crystal layer 12 after sequentially passing through the lower polarizer 13 and the first substrate 10, and realizes the control of the light intensity in the pixel level in the liquid crystal layer 12. Normally, the blue light in the backlight module 15 will pass through the liquid crystal layer 12 and the upper polarizer at a certain divergence angle to be directed toward the color conversion layer 16. At this time, for the light that should pass through the sub-pixel area of a specific color (such as the red sub-pixel area), the phenomenon is inevitable that part of the light will irradiate to the adjacent sub-pixel areas of different colors (such as the green sub-pixel area and the blue sub-pixel area). That is, the blue light that should have passed through the first color conversion part 161 inevitably irradiates part of the blue light to the adjacent second color conversion part 162 and the light-transmitting part 163. Accordingly, there is a risk of color crosstalk between lights of different colors after passing through the color conversion layer 16. The farther the distance between the color conversion layer 16 and the liquid crystal layer 12 is, the larger the area affected by the divergence angle of the backlight is, and then the more serious the color crosstalk phenomenon becomes.

In this embodiment, since the third substrate 17 is the substrate of the color conversion layer 16, by disposing the third substrate 17 on the side of the color conversion layer 16 away from the liquid crystal layer 12, the contrast of the liquid crystal display device 100 can be improved while minimizing the distance between the color conversion layer 16 and the liquid crystal layer 12 in this embodiment. Therefore, the influence of the divergence angle of the backlight can be reduced, and the risk of color crosstalk can be reduced to the greatest extent, thereby helping to improve the display effect of the liquid crystal display device 100. In addition, the third substrate 17 in this embodiment can also serve as a cover plate in the liquid crystal display device 100, thereby eliminating the need for an additional cover plate in the liquid crystal display device 100.

Besides, the liquid crystal display device 100 further includes a light-shielding part 18. The light-shielding part 18 is arranged on the side of the third substrate 17 close to the upper polarizer 14. The light-shielding part 18 is located between the first color conversion part 161 and the second color conversion part 162, between the first color conversion part 161 and the light-transmitting part 163 and between the second color conversion part 162 and the light-transmitting part 163. The arrangement of the light-shielding part 18 can avoid color crosstalk between adjacent color conversion parts and between the color conversion part and the light-transmitting part, which is beneficial to improve the display effect. In detail, the light-shielding part 18 may be made of a material having a light-absorbing effect, such as a black matrix.

Furthermore, the liquid crystal display device 100 further includes a protective layer 19. The protective layer 19 is arranged on the side of the color conversion layer 16 close to the upper polarizer 14. On one hand, since the color conversion layer 16 in this embodiment needs to be formed on the third substrate 17, and then aligned and bonded with the lower polarizer 13, the arrangement of the protective layer 19 can prevent the color conversion layer 16 from being damaged during the alignment process and reducing the light efficiency; on the other hand, the arrangement of the protective layer 19 prevents external water and oxygen from entering the color conversion layer 16 and reduces the color conversion efficiency. The protective layer 19 is arranged on the entire surface of the color conversion layer 16, the light-transmitting part 163 and the light-shielding part 18 to maximize the protective effect of the protective layer 19.

In detail, a material of the protective layer 19 may include an inorganic material. The inorganic material may be one or more of silicon nitride, silicon oxide and silicon oxynitride. In this embodiment, the material of the protective layer 19 is silicon nitride. In some embodiments, the material of the protective layer 19 may also be an organic material, and the organic material may be PET or PMMA or the like.

In detail, in some embodiments, the protective layer 19 may also be arranged on the side of the color conversion layer 16 away from the upper polarizer 14; or, the protective layer 19 can also be arranged on the opposite sides of the color conversion layer 16 at the same time, which will not be repeated here.

Furthermore, the liquid crystal display device 100 further includes an adhesive layer 20. The adhesive layer 20 is attached between the upper polarizer 14 and the protective layer 19. The arrangement of the adhesive layer 20 can improve the bonding stability of the protective layer 19 and the upper polarizer 14 to avoided that the light-emitting effect is affected by the misalignment between the color conversion layer 16 and the upper polarizer 14. The material of the adhesive layer 20 may be a pressure-sensitive adhesive or other adhesive material with an adhesive effect, and the material of the adhesive layer 20 is not limited in the present application.

Figure 3:
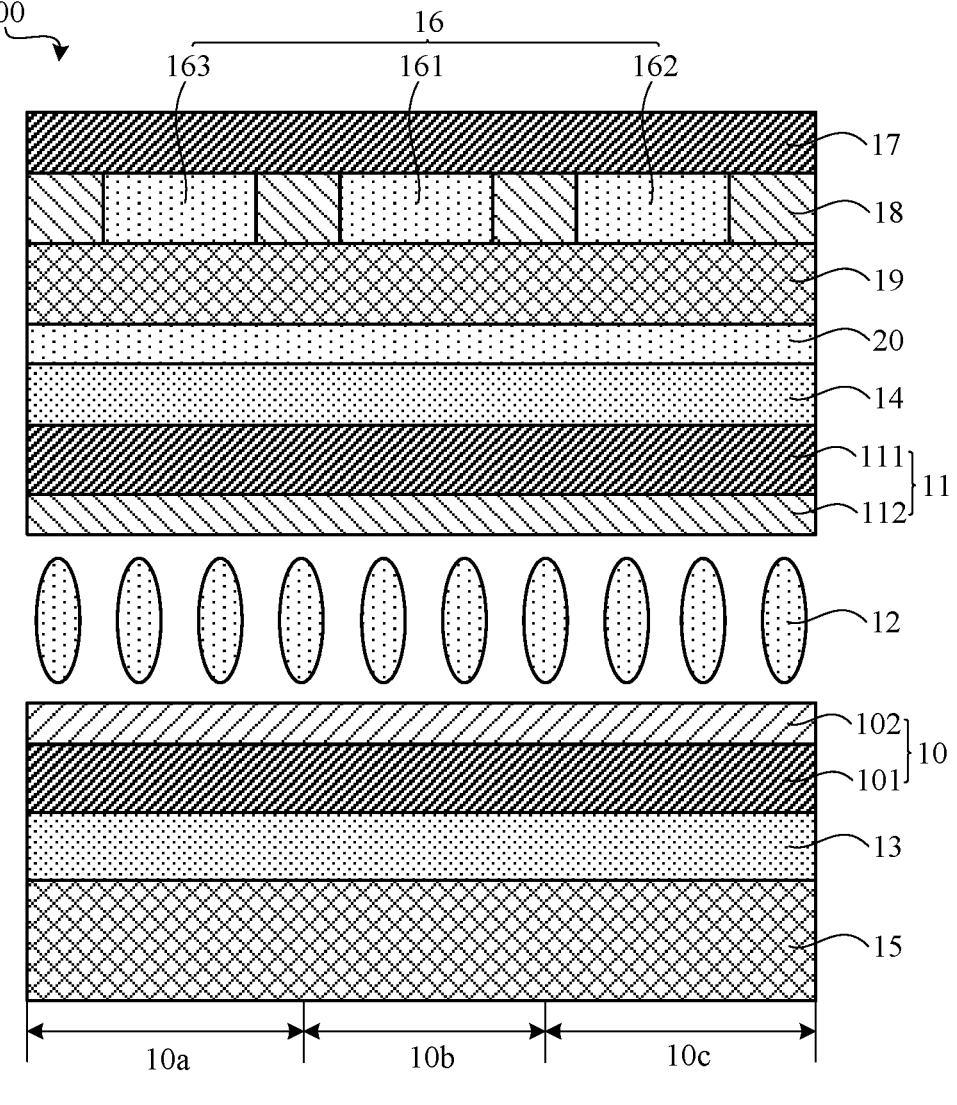
FIG. 3 is a cross-sectional view diagram of a second embodiment of the liquid crystal display device shown in FIG. 1 along the section line A-A'.

Please refer to FIG. 3. The second embodiment of the present application provides a liquid crystal display device 100. The difference of the liquid crystal display device 100 provided by the second embodiment of the present application from the first embodiment is: The light emitted by the backlight module 15 is red light. The first color conversion part 161 is located in the second sub-pixel area 10b. The second color conversion part 162 is located in the third sub-pixel area 10c. The light-transmitting part 163 is located in the first sub-pixel area 10a. The up-conversion material in the first color conversion part 161 is a green up-conversion material, and the up-conversion material in the second color conversion part 162 is a blue up-conversion material.

In this embodiment, the up-conversion material is employed as the color conversion material. Thus, the color conversion layer 16 can convert light with a shorter wavelength and higher energy into light with a longer wavelength and lower energy, thereby realizing color conversion.

In detail, since the up-conversion material in the first color conversion part 161 is the green up-conversion material, the up-conversion material in the second color conversion part 162 is the blue up-conversion material, and the light emitted by the backlight module 15 is red light, the first color conversion part 161 can generate green light under the excitation of red light, and the second color conversion part 162 can generate blue light under the excitation of red light.

The up-conversion material may include up-conversion nanoparticles doped with lanthanides, such as rare earth elements. Illustratively, the aforesaid up-conversion nanoparticles can be erbium-ytterbium co-doped sodium tetrafluoroyttrium (NaYF4: Yb, Er) nanoparticles, neodymium-thulium-ytterbium co-doped sodium tetrafluoroyttrium (NaYF4: Yb, Nd, Tm) nanoparticles or thulium-ytterbium co-doped with sodium tetrafluoroyttrium (NaYF4: Yb, Tm) nanoparticles.

Figure 4:
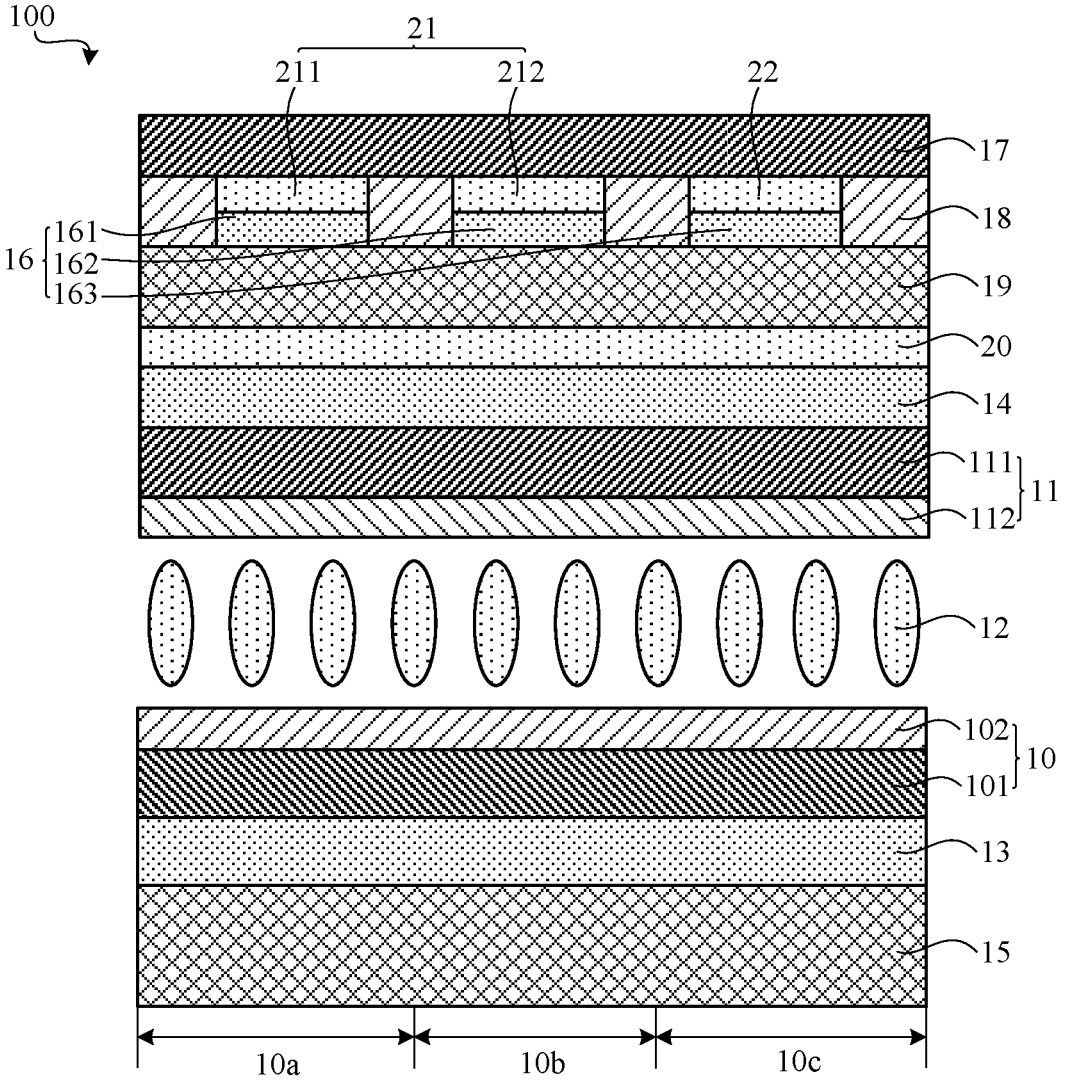
FIG. 4 is a cross-sectional view diagram of a third embodiment of the liquid crystal display device shown in FIG. 1 along the section line A-A'.

Please refer to FIG. 4. The third embodiment of the present application provides a liquid crystal display device 100. The difference of the liquid crystal display device 100 provided by the third embodiment of the present application from the first embodiment is: a material of the first color conversion part 161 includes a red fluorescent material and a material of the second color conversion part 162 includes a green fluorescent material, and the liquid crystal display device 100 further includes a blue light absorbing layer 21 and a blue filter part 22, and the blue light absorbing layer 21 is located on the side of the first color conversion part 161 and the second color conversion part 162 away from the upper polarizer 14, and the blue filter part 22 and the blue light absorbing layer 21 are arranged in the same layer, and are located on the side of the light-transmitting part 163 away from the upper polarizer 14.

In this embodiment, by arranging the blue light absorbing layer 21 on the side of the first color conversion part 161 and the second color conversion part 162 away from the upper polarizer 14, the blue light in the ambient light can be absorbed, the interference of the red fluorescent material in the first color conversion part 161 and the green fluorescent material in the second color conversion part 162 are prevented from being excited by the blue light in the ambient light.

In this embodiment, the material of the first color conversion part 161 further includes a first matrix material, and the first color conversion part 161 is formed by doping the first matrix material with the red fluorescent material. The material of the second color conversion part 162 further includes a second matrix material, and the second color conversion part 162 is formed by doping the second matrix material with the green fluorescent material. The first matrix material and the second matrix material are the same, and both can be transparent resin. In some embodiments, the material of the first color conversion part 161 may further include the red filter material, and the second color conversion part 162 may further include the green filter material, and will not be repeated here.

In this embodiment, the blue light absorbing layer 21 includes a red filter part 211 and a green filter part 212. The red filter part 211 is located on the side of the first color conversion part 161 away from the upper polarizer 14. The green filter part 212 is located on the side of the second color conversion part 162 away from the upper polarizer 14. The red filter part 211 includes a red filter material, which is employed to filter light of colors other than red light. The green filter part 212 includes a green filter material, which is employed to filter light of colors other than green light. The blue filter part 22 includes a blue filter material, which is employed to filter light of colors other than blue light. All the red filter material, the green filter material and the blue filter material include resin, inorganic pigment particles and organic dyes. For related materials, reference can be made to the prior art, which will not be repeated here.

Figure 5:
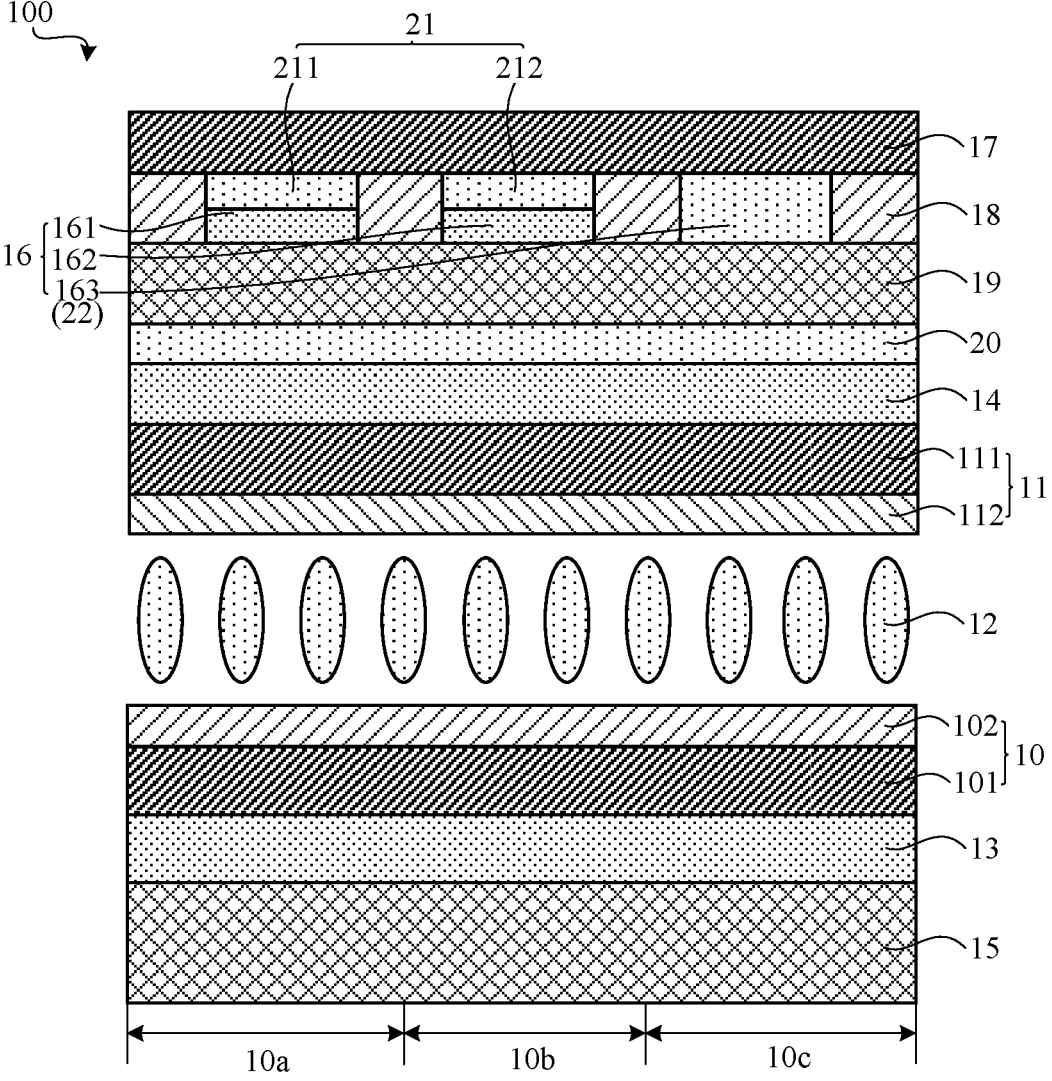
FIG. 5 is a cross-sectional view diagram of a fourth embodiment of the liquid crystal display device shown in FIG. 1 along the section line A-A'.

Please refer to FIG. 5. The fourth embodiment of the present application provides a liquid crystal display device 100. The difference of the liquid crystal display device 100 provided by the fourth embodiment of the present application from the third embodiment is: The light-transmitting part 163 and the blue filter part 22 are integrally formed.

In detail, the light-transmitting part 163 and the blue filter part 22 are made by the same process. The foregoing arrangement enables the light-transmitting part 163 to be directly formed when the blue filter part 22 is formed, thereby simplifying the process and saving process cost.

Figure 6:
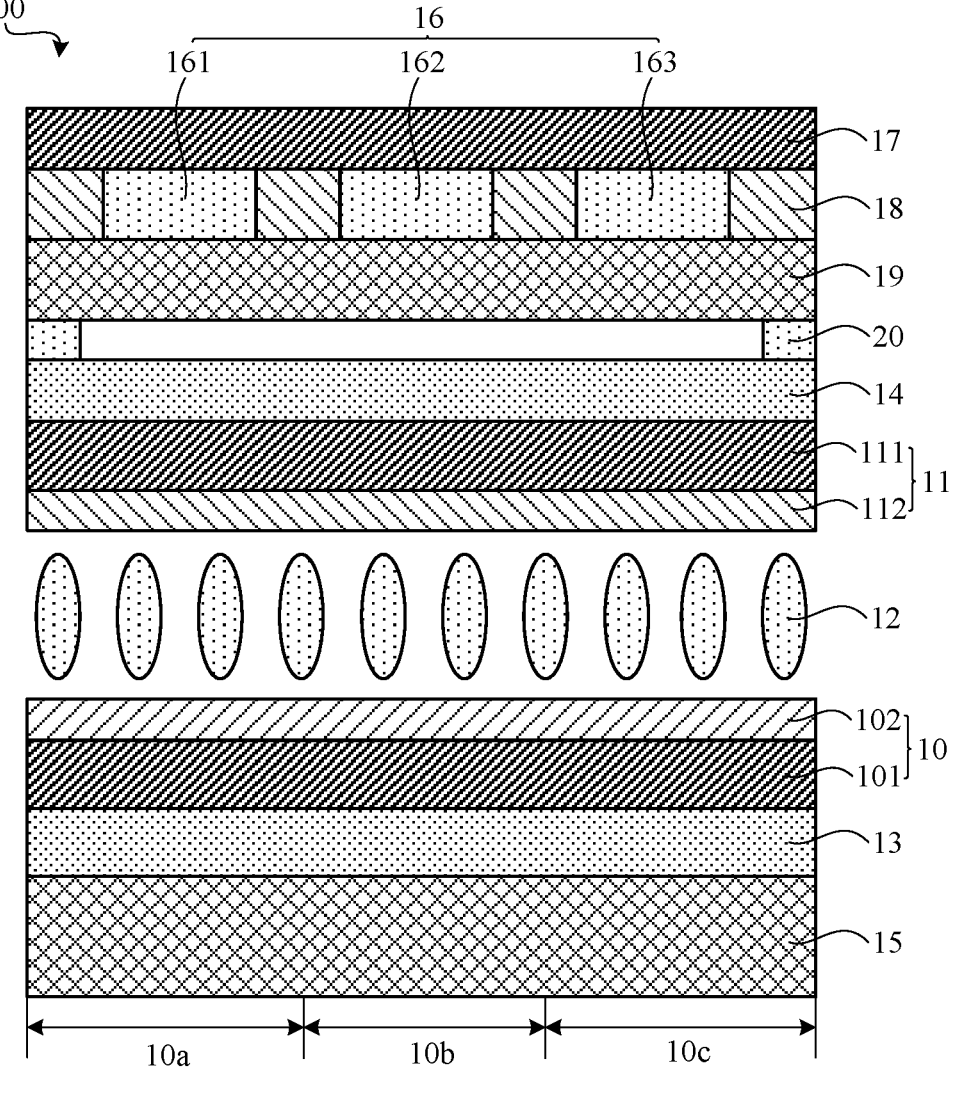
FIG. 6 is a cross-sectional view diagram of a fifth embodiment of the liquid crystal display device shown in FIG. 1 along the section line A-A'.

Please refer to FIG. 6. The fifth embodiment of the present application provides a liquid crystal display device 100. The difference of the liquid crystal display device 100 provided by the fifth embodiment of the present application from the first embodiment is: The adhesive layer 20 is attached to an inner periphery between the upper polarizer 14 and the protective layer 19.

Compared with the full bonding method between the upper polarizer 14 and the protective layer 19 in the first embodiment, the adhesive layer 20 is attached to the inner periphery between the upper polarizer 14 and the protective layer 19 in this embodiment. Namely, in this embodiment, the frame attachment is adopted to realize the connection between the upper polarizer 14 and the protective layer 19, which reduces the bonding area between the upper polarizer 14 and the protective layer 19. When the related substrate in the liquid crystal display device 100 needs to be replaced due to failure, the smaller bonding area is beneficial to the replacement of the substrate.

Figure 7:
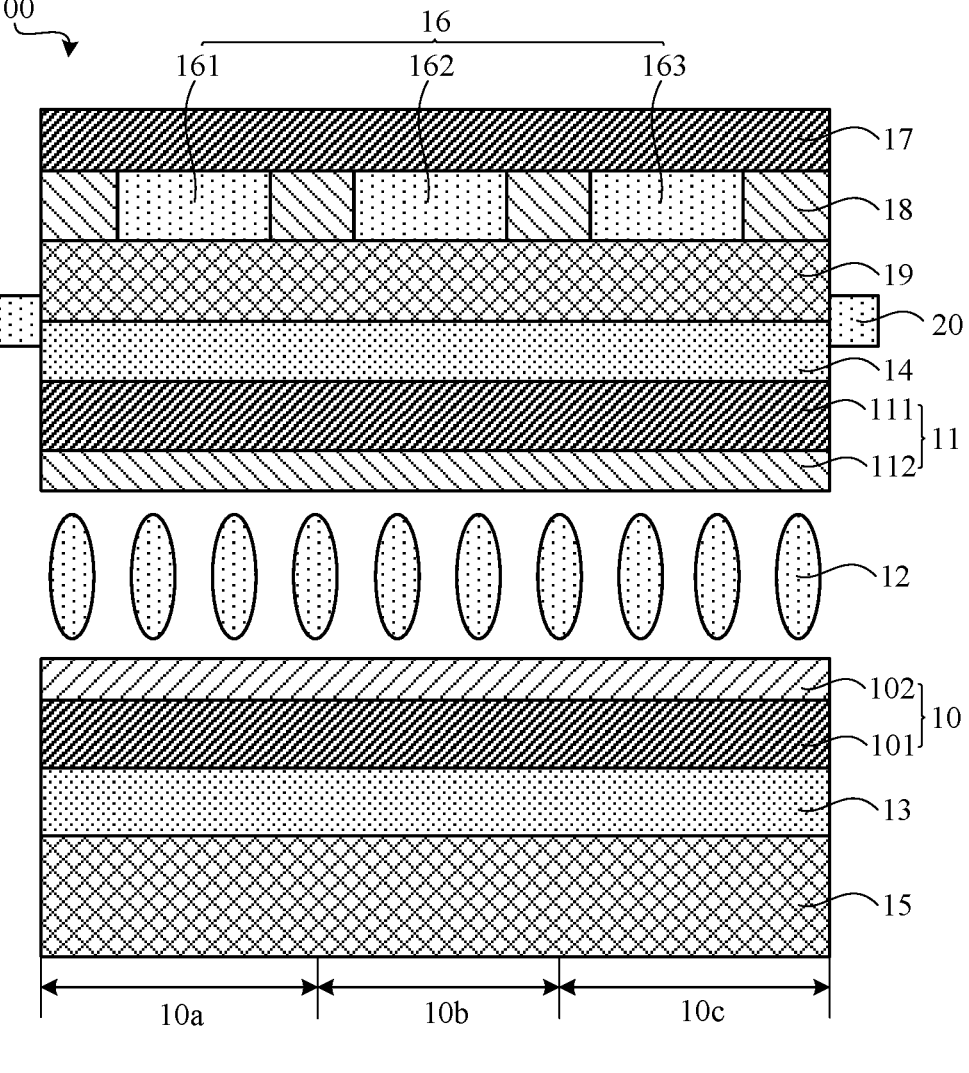
FIG. 7 is a cross-sectional view diagram of a sixth embodiment of the liquid crystal display device shown in FIG. 1 along the section line A-A'.

Please refer to FIG. 7. The sixth embodiment of the present application provides a liquid crystal display device

100. The difference of the liquid crystal display device 100 provided by the sixth embodiment of the present application from the first embodiment is: The adhesive layer 20 is attached to an outer periphery of connection between the upper polarizer 14 and the protective layer 19.

In this embodiment, the adhesive layer 20 is arranged at the outer periphery of connection between the upper polarizer 14 and the protective layer 19. The space between the upper polarizer 14 and the protective layer 19 can be omitted, which is beneficial to reduce the thickness of the liquid crystal display device 100.

The liquid crystal display device provided by the embodiments of the present application are described in detail as aforementioned, and the principles and implementations of the present application have been described with reference to specific illustrations. The description of the foregoing embodiments is merely for helping to understand the technical solutions of the present application and the core ideas thereof; meanwhile, those skilled in the art will be able to change the specific embodiments and the scope of the application according to the idea of the present application. In conclusion, the content of the specification should not be construed as limiting the present application.

What is claimed is:

1. A liquid crystal display device, wherein the liquid crystal display device comprises:
   a first substrate;
   a second substrate arranged opposite to the first substrate;
   a liquid crystal layer arranged between the first substrate and the second substrate;
   an upper polarizer arranged on a side of the second substrate away from the first substrate;
   a color conversion layer arranged on a side of the upper polarizer away from the second substrate;
   a third substrate arranged on a side of the color conversion layer away from the upper polarizer;
   a protective layer located on a side of the color conversion layer close to the upper polarizer; and
   an adhesive layer disposed between the upper polarizer and the protective layer;
   wherein the adhesive layer is attached to an inner periphery at an interface between the upper polarizer and the protective layer, and an enclosed space is defined by the adhesive layer, the protective layer, and the upper polarizer.

2. The liquid crystal display device according to claim 1, wherein the liquid crystal display device comprises a plurality of pixel areas, each of the pixel areas comprises a first sub-pixel area, a second sub-pixel area, and a third sub-pixel area, the color conversion layer comprises a first color conversion part, a second color conversion part, and a light-transmitting part that are arranged at intervals, the first color conversion part and the second color conversion part are configured to convert light of different colors, the first color conversion part is located in the first sub-pixel area, the second color conversion part is located in the second sub-pixel area, and the light-transmitting part is located in the third sub-pixel area; and
   the first sub-pixel area is a red sub-pixel area, the second sub-pixel area is a green sub-pixel area, the third sub-pixel area is a blue sub-pixel area, and light emitted by a backlight module of the liquid crystal display device is blue light; a material of the first color conversion part comprises a red fluorescent material and a red filter material, a material of the second color conversion part comprises a green fluorescent material and a green filter material, and the light-transmitting part comprises a blue filter material.

3. The liquid crystal display device according to claim 2, wherein the red fluorescent material is red fluorescent powder or red quantum dots, and the green fluorescent material is green fluorescent powder or green quantum dots.

4. The liquid crystal display device according to claim 1, wherein a material of the protective layer comprises one or more of silicon nitride, silicon oxide, and silicon oxynitride.

5. The liquid crystal display device according to claim 1, wherein the liquid crystal display device further comprises a light-shielding part provided on a side of the third substrate close to the upper polarizer, and the light-shielding part is located between the first color conversion part and the second color conversion part, between the first color conversion part and the light-transmitting part, and between the second color conversion part and the light-transmitting part.

6. The liquid crystal display device according to claim 1, wherein the red filter material and the green filter material each comprise resin, inorganic pigment particles, and an organic dye.

7. The liquid crystal display device according to claim 1, wherein the light-transmitting part comprises a blue filter material, wherein the blue filter material comprises resin, inorganic pigment particles, and an organic dye.

8. The liquid crystal display device according to claim 1, wherein the liquid crystal display device comprises a plurality of pixel areas, each of the pixel areas comprises a first sub-pixel area, a second sub-pixel area, and a third sub-pixel area, the color conversion layer comprises a first color conversion part, a second color conversion part, and a light-transmitting part that are arranged at intervals, the first color conversion part and the second color conversion part are configured to convert light of different colors, the first color conversion part is located in the first sub-pixel area, the second color conversion part is located in the second sub-pixel area, and the light-transmitting part is located in the third sub-pixel area.

9. The liquid crystal display device according to claim 8, wherein the first sub-pixel area is a red sub-pixel area, the second sub-pixel area is a green sub-pixel area, the third sub-pixel area is a blue sub-pixel area, light emitted by a backlight module of the liquid crystal display device is blue light, a material of the first color conversion part comprises a red fluorescent material, a material of the second color conversion part comprises a green fluorescent material, and the liquid crystal display device further comprises a blue light absorbing layer located on a side of the first color conversion part and the second color conversion part disposed away from the upper polarizer.

10. The liquid crystal display device according to claim 9, wherein the blue light absorbing layer comprises a red filter part and a green filter part, the red filter part is located on a side of the first color conversion part away from the upper polarizer, and the green filter part is located on a side of the second color conversion part away from the upper polarizer.

11. The liquid crystal display device according to claim 9, wherein a material of the light-transmitting part comprises a blue filter material, the liquid crystal display device further comprises a blue filter part, and the blue filter part and the blue light absorbing layer are arranged in a same layer and are located on a side of the light-transmitting part away from the upper polarizer.

12. A liquid crystal display device, wherein the liquid crystal display device comprises:
a first substrate;
a second substrate arranged opposite to the first substrate;

a liquid crystal layer arranged between the first substrate and the second substrate;
an upper polarizer arranged on a side of the second substrate away from the first substrate;
a color conversion layer arranged on a side of the upper polarizer away from the second substrate;
a third substrate arranged on a side of the color conversion layer away from the upper polarizer;
a light-shielding part arranged on a side of the third substrate close to the upper polarizer;
a protective layer located on a side of the color conversion layer close to the upper polarizer; and
an adhesive layer disposed between the upper polarizer and the protective layer;
wherein the liquid crystal display device comprises a plurality of pixel areas, each of the pixel areas comprises a first sub-pixel area, a second sub-pixel area, and a third sub-pixel area, the color conversion layer comprises a first color conversion part, a second color conversion part, and a light-transmitting part that are arranged at intervals, the first color conversion part and the second color conversion part are configured to convert light of different colors, the first color conversion part is located in the first sub-pixel area, the second color conversion part is located in the second sub-pixel area, the light-transmitting part is located in the third sub-pixel area, and the light-shielding part is located between the first color conversion part and the second color conversion part, between the first color conversion part and the light-transmitting part, and between the second color conversion part and the light-transmitting part; and
wherein the adhesive layer is attached to an inner periphery at an interface between the upper polarizer and the protective layer, and an enclosed space is defined by the adhesive layer, the protective layer, and the upper polarizer.

13. The liquid crystal display device according to claim 12, wherein the first sub-pixel area is a red sub-pixel area, the second sub-pixel area is a green sub-pixel area, the third sub-pixel area is a blue sub-pixel area, and light emitted by a backlight module of the liquid crystal display device is blue light; a material of the first color conversion part comprises a red fluorescent material and a red filter material, a material of the second color conversion part comprises a green fluorescent material and a green filter material, and the light-transmitting part comprises a blue filter material.

14. The liquid crystal display device according to claim 13, wherein the red fluorescent material is red fluorescent powder or red quantum dots, and the green fluorescent material is green fluorescent powder or green quantum dots.

15. The liquid crystal display device according to claim 12, wherein a material of the protective layer comprises one or more of silicon nitride, silicon oxide, and silicon oxynitride.

16. The liquid crystal display device according to claim 12, wherein the red filter material and the green filter material each comprise resin, inorganic pigment particles, and an organic dye.

17. The liquid crystal display device according to claim 12, wherein the light-transmitting part comprises a blue filter material, wherein the blue filter material comprises resin, inorganic pigment particles, and an organic dye.

18. A liquid crystal display device, comprising:
a first substrate;
a second substrate arranged opposite to the first substrate;

a liquid crystal layer arranged between the first substrate and the second substrate;

an upper polarizer arranged on a side of the second substrate away from the first substrate;

a color conversion layer arranged on a side of the upper polarizer away from the second substrate;

a third substrate arranged on a side of the color conversion layer away from the upper polarizer;

a protective layer located on a side of the color conversion layer close to the upper polarizer; and an adhesive layer arranged around both an outer peripheral surface of the upper polarizer and an outer peripheral surface of the protective layer;

wherein the protective layer is in contact with the upper polarizer, and the adhesive layer is attached to an outer periphery of a junction between the upper polarizer and the protective layer.

19. The liquid crystal display device according to claim 18, wherein the liquid crystal display device comprises a plurality of pixel areas, each of the pixel areas comprises a first sub-pixel area, a second sub-pixel area, and a third sub-pixel area, the color conversion layer comprises a first color conversion part, a second color conversion part, and a light-transmitting part that are arranged at intervals, the first color conversion part and the second color conversion part are configured to convert light of different colors, the first color conversion part is located in the first sub-pixel area, the second color conversion part is located in the second sub-pixel area, and the light-transmitting part is located in the third sub-pixel area; and the first sub-pixel area is a red sub-pixel area, the second sub-pixel area is a green sub-pixel area, the third sub-pixel area is a blue sub-pixel area, and light emitted by a backlight module of the liquid crystal display device is blue light; a material of the first color conversion part comprises a red fluorescent material and a red filter material, a material of the second color conversion part comprises a green fluorescent material and a green filter material, and the light-transmitting part comprises a blue filter material.

20. The liquid crystal display device according to claim 19, wherein the red fluorescent material is red fluorescent powder or red quantum dots, and the green fluorescent material is green fluorescent powder or green quantum dots.

* * * * *